(12) United States Patent
Erike (10) Patent No.: US 7,563,335 B2
(45) Date of Patent: Jul. 21, 2009

(54) METHOD OF FORMING A HOUSING OF A VEHICLE OCCUPANT PROTECTION APPARATUS

(75) Inventor: Eric C. Erike, Mesa, AZ (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 406 days.

(21) Appl. No.: 11/268,442

(22) Filed: Nov. 7, 2005

(65) Prior Publication Data

US 2007/0107201 A1 May 17, 2007

(51) Int. Cl.
*C21D 8/10* (2006.01)
*C21D 8/00* (2006.01)

(52) U.S. Cl. .................. 148/650; 148/520; 148/528; 148/570; 148/593; 280/741; 72/367.1; 29/897.2

(58) Field of Classification Search .................. 148/519, 148/520, 521, 525, 528, 534, 570, 572, 575, 148/593, 649, 650, 651, 652; 280/741; 72/209, 72/349, 347, 367.1, 368; 29/897.2, 890.14
See application file for complete search history.

(56) References Cited

U.S. PATENT DOCUMENTS

| | | | |
|---|---|---|---|
| 3,645,725 A | 2/1972 | Denhard, Jr. et al. | |
| 4,078,415 A * | 3/1978 | Koch et al. | 72/356 |
| 4,765,953 A | 8/1988 | Hagenfledt et al. | |
| RE33,006 E | 8/1989 | Hataya et al. | |
| 4,892,704 A | 1/1990 | Sawaragi | |
| 5,348,344 A | 9/1994 | Blumenthal et al. | |
| 6,173,495 B1 * | 1/2001 | Erike | 29/890.14 |
| 6,386,583 B1 | 5/2002 | Erike | |
| 6,589,373 B2 * | 7/2003 | Starozhitsky et al. | 148/570 |
| 6,746,046 B2 * | 6/2004 | Rink et al. | 280/737 |
| 2005/0016246 A1 * | 1/2005 | Yamanaka et al. | 72/355.6 |
| 2005/0145004 A1 * | 7/2005 | Vescovini | 72/334 |

FOREIGN PATENT DOCUMENTS

JP 5-255749 5/1993

OTHER PUBLICATIONS

English abstract of Japanese patent 361261423, Masazumi Onishi, Nov. 19, 1986.*
ASM Metals Handbook, vol. 1, Carbon and low-alloy steel Plate, Revised by F.B. Fletcher, Lukens Steel Company, 2002. pp. 1-18.*
Treatise entitled "Worldwide Guide to Equivalent Irons and Steels", pp. iii-iv, 5-1 to 5-10, and 5-135-5-137, (ASM Intl. $3^{rd}$ ed, 1993).
Treatise entitled "Understanding How Components Fail", pp. 83-84, (ASM Intl. $2^{nd}$ ed, 2000).
Treatise entitled "ASM Specialty handbook: Carbon and Alloy Steels", pp. 55-22 and 230-232, (ASM Intl. 1996).

* cited by examiner

*Primary Examiner*—Deborah Yee
(74) *Attorney, Agent, or Firm*—Tarolli, Sundheim, Covell & Tummino LLP (57) ABSTRACT

A method of forming a dual chamber seamless tube (64) includes providing a slug of steel (56) and cold working a first end (70) of the slug (56) to form a first chamber (114) and cold working a second end (72) of the slug (56) to form a second chamber (116). The first and second chambers (114 and 116) are axially aligned and separated by a wall portion (126) of the tube (64).

12 Claims, 5 Drawing Sheets

METHOD OF FORMING A HOUSING OF A VEHICLE OCCUPANT PROTECTION APPARATUS

FIELD OF THE INVENTION

The present invention relates to a method of forming a dual chamber housing for a pressure vessel and particularly relates to a method of forming a dual chamber housing of an inflator for deploying an inflatable vehicle occupant protection device.

BACKGROUND OF THE INVENTION

Metallic materials are frequently used in the production of containers for the storage of gases and gas mixtures. For example, steel can be used to form a storage container (i.e., housing) of an inflator for deploying a vehicle occupant protection device. The inflator housing can contain the gases or gas mixtures at elevated pressures.

An inflator housing can be formed from steel. The steel used to form the inflator housing should have sufficient tensile strength to store the gas or gas mixture at an elevated pressure. The steel should also be resistant to hydrogen embrittlement, and have a toughness sufficient to prevent brittle fracture of the inflator housing.

SUMMARY OF THE INVENTION

The present invention relates to a method of forming a dual chamber housing of a pressure vessel. In the method, a slug of steel is provided. The slug extends from a first end to a second end. The first end and the second end of the slug are cold worked to form a first chamber, a second chamber, and a wall portion. The second chamber is axially aligned with the first chamber and separated from the first chamber by the wall portion.

In an aspect of the invention, the first end can be cold worked to form a first annular wall. The first annular wall can be formed by placing the slug in a cavity of a die and applying pressure to the first end with a first punch. The second end can be cold worked to form a second annular wall. The second annular wall can be formed by placing the slug in the cavity of the die and applying pressure to the second end with a second punch. The cavity of the die can have a substantially cylindrical shape that defines the shape of the housing.

In another aspect of the invention, the slug can comprise a steel having a tensile strength of at least about 350 MPa, a yield strength of at least about 200 MPa, and a yield strength of at least about 22%. The steel can be a low-carbon steel or a high-alloy steel.

In a further aspect of the invention, the cold worked first end and the cold worked second end can be heat treated. The heat treating can include induction heating the cold worked first end and the cold worked second end and then cooling the induction heated first end and second end. During induction heating, the cold worked first end and the cold worked second end can be heated to a temperature of at least about 900° C.

The present invention also relates to a method of forming a dual chamber housing of a vehicle occupant protection apparatus. In the method, a slug of steel is provided. The slug extends from a first end to a second end. The first end and the second end of the slug are cold worked to form a first chamber, a second chamber, and a wall portion. The second chamber is axially aligned with the first chamber and separated from the first chamber by the wall portion. The cold worked first end and the cold worked second end are then heat treated.

The present invention further relates to an apparatus for deploying a vehicle occupant protection device. The apparatus comprising a seamless tube with a first end and a second end. The first end defines a first chamber and the second end defines a second chamber. The second chamber is axially aligned with the first chamber and is separated from the first chamber by a wall portion. The seamless tube and wall portion are formed from single slug of steel.

The first chamber can contain a first pressurized inflation fluid, and the second chamber can contain a second pressurized inflation fluid. The first inflation fluid is separated from the second inflation fluid by the wall portion. A first end cap can be attached to the first end and a second end cap that can be attached to the second end to contain the inflation fluid within, respectively, the first chamber and the second chamber.

BRIEF DESCRIPTION OF THE DRAWINGS

The foregoing and other features of the invention will become more apparent to one skilled in the art upon consideration of the following description of the invention and the accompanying drawings in which.

DETAILED DESCRIPTION

The present invention relates to a dual chamber housing of pressure vessel and to a method of forming the dual chamber housing from a slug of steel. The dual chamber housing of the present invention can comprise at least a portion of an inflator for actuating a vehicle occupant protection device.

Figure 1:
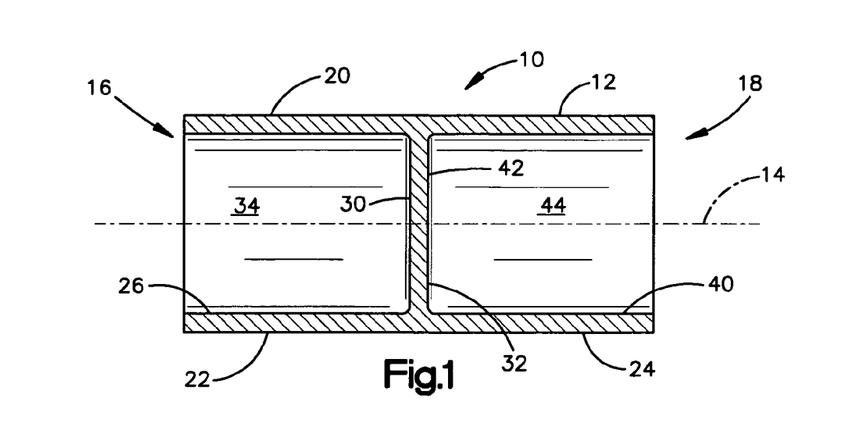
FIG. 1 illustrates a schematic cross-sectional view of a dual chamber housing in accordance with an aspect of the invention.

FIG. 1 illustrates a schematic cross-sectional view of a dual chamber housing 10 in accordance with an aspect of the invention. The dual chamber housing 10 includes a seamless tube 12 that extends along an axis 14 from a first end 16 to a second end 18. The seamless tube 12 defines a substantially cylindrical outer surface 20 that extends the length of the seamless tube 12.

The seamless tube 12 includes a first annular wall portion 22 and a second annular wall portion 24. The first annular wall portion 22 includes a first inner surface 26 that extends from the first end 16 to a first surface 30 of an intermediate wall portion 32 of the seamless tube 12. The first inner surface 26 of the first annular wall portion 22 and the first surface 30 of the intermediate wall portion 32 define a first chamber 34. The first chamber 34 has a substantially cylindrical shape and is centered on axis 14.

The second annular wall portion 24 includes a second inner surface 40 that extends from the second end 18 to a second surface 42 of the intermediate wall portion 32. The second inner surface 40 of the second annular wall portion 24 and the second surface 42 of the intermediate wall portion 32 define a second chamber 44. The intermediate wall portion 32 separates the first chamber 34 from the second chamber 44. The second chamber 44 has a substantially cylindrical shape and is centered on axis 14 as well as aligned with the first chamber 34.

The first annular wall portion 22, the second annular wall portion 24, and the intermediate wall portion 32 of the seamless tube 12 comprise a homogenous steel material. By "homogenous steel material", it is meant the composition of the steel that forms the first annular wall 22 portion, the second annular wall portion 24 and intermediate wall portion 32 is the same. The first annular wall portion 22, the second annular wall portion 24, and the intermediate wall portion 32 are also integral with each other so that the seamless tube 12 has a one-piece structure that comprises the homogenous steel material.

Figure 2:
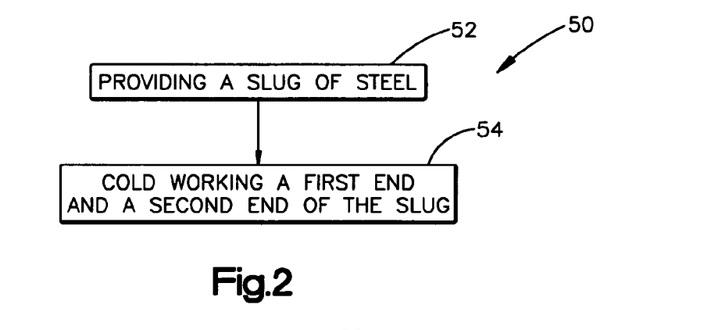
FIG. 2 illustrates a schematic flow diagram of a method of forming the dual chamber housing of FIG. 1.

The seamless tube 10 of the dual chamber housing 12 is formed from a single slug of steel. By "slug of steel", it is meant a piece of steel that is roughly shaped for subsequent processing. FIG. 2 is schematic flow diagram illustrating a method 50 of forming the seamless tube of the dual chamber housing from the slug of steel. In the method 50, at 52, a slug of steel is provided. The slug can comprise a low-carbon steel. By "low-carbon steel" as used in the specification and in the claims, it is meant a carbon steel, which contains up to about 0.30%, by weight, carbon. A steel is considered to be a carbon steel by the American Iron and Steel Institute (AISI) when the following criteria are met. (1) The steel's properties or characteristics (e.g., microstructure, tensile strength, yield strength, and elongation at break) are determined principally by its carbon content. (2) The steel contains only incidental amounts of alloying elements (e.g., less than about 2% for each alloying element) other than silicon, manganese, copper, sulfur, and phosphorus. (3) No minimum content is specified or required for chromium, cobalt, niobium (i.e., columbium), molybdenum, nickel, titanium or any other element to be added to obtain a desired alloy effect. (4) The specified minimum for copper does not exceed 0.40%. (5) The maximum content specified for any of the following elements does not exceed the percentages noted: manganese 1.65%, silicon 0.60%, and copper 0.60%.

Carbon steels comprise the 1XXX grades in the Society of Automotive Engineers-AISI (SAE-AISI) system and are subdivided into four distinct grades—10XX grade, 11XX grade, 12XX grade, and 15XX grade. Examples of low-carbon 10XX grade steels that can be used in accordance with the present invention include SAE-AISI 1005, 1006, 1008, 1010, 1012, 1013, 1015, 1016, 1017, 1018, 1019, 1020, 1021, 1022, 1023, 1025, 1026, 1029, 1030, and 1035 grade steels. Examples of low-carbon 11XX grade steels that can be used in accordance with the present invention include SAE-AISI 1108, 1110, and 1117 grade steels. Examples of low-carbon 12XX grade steels that can be used in accordance with the present invention include SAE-AISI 1211, 1212, 1213, and 1215 grade steels. Examples of low-carbon 15XX grade steels that can be used in accordance with the present invention include SAE-AISI 1510, 1513, 1522, 1524, 1526, 1527, and 1536 grade steels.

It will be appreciated by one skilled in the art that other low-carbon steels can be used in accordance with the present invention. These other low-carbon steels can include variations of SAE-AISI 1XXX grade steel.

One example of a variation of an SAE-AISI 1XXX grade steel is an SAE-AISI 1010 grade steel in which the composition is controlled so that the weight percent of carbon does not exceed about 0.12%, the weight percent of sulfur does not exceed about 0.015%, the weight percent of phosphorous does not exceed about 0.020%, the weight percent of chromium does not exceed about 1.30%, the weight percent of molybdenum does not exceed about 0.60%, and the combined weight percent of phosphorous and sulfur does not exceed about 0.025%. This low-carbon steel composition has increased strength, better corrosion resistance, and better overall structural integrity compared to conventional low-carbon SAE-AISI 1XXX grade steel.

Figure 11:
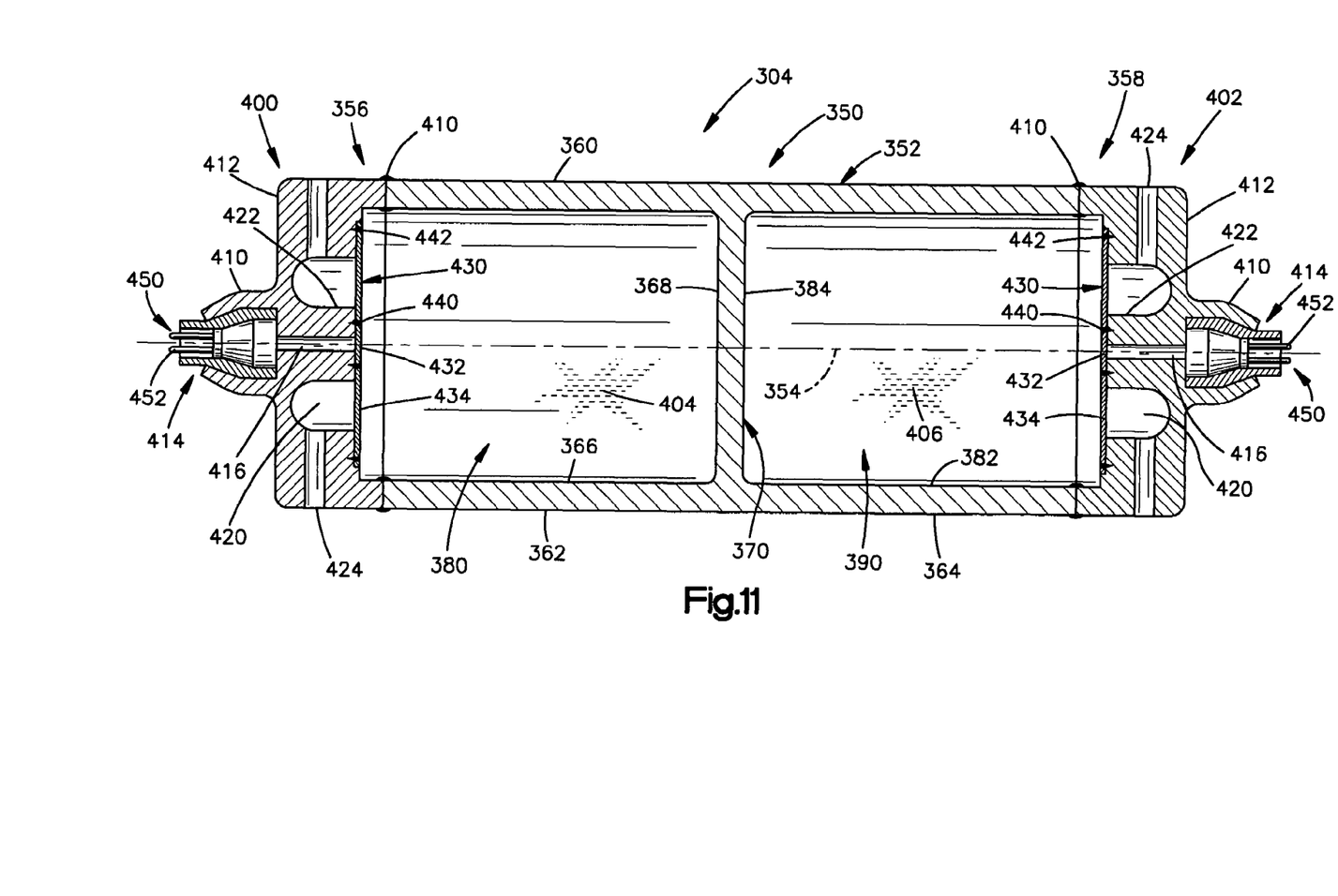
FIG. 11 illustrates a sectional view of part of the apparatus of FIG. 10.

Another example of a variation of an SAE-AISI 1XXX grade steel that is particularly suited for use in a housing of a vehicle occupant protection apparatus, such as shown and described with respect to FIG. 11, consists essentially of, by weight, about 0.07% to about 0.20% carbon, up to about 1.60% manganese, up to about 0.030% phosphorous, up to about 0.025% sulfur, about 0.06% to about 0.35% silicon, up to about 1.20% chromium, up to about 0.65% nickel, up to about 0.70% molybdenum, up to about 0.35% copper, about 0.02% to about 0.06% aluminum, up to about 0.10% vanadium, up to about 0.25% residual elements, and the balance iron. By residual elements, it is meant the combined weight of additional elements including, for example, titanium, lead, niobium, cobalt, calcium, and/or tin.

Yet another example of a variation of an SAE-AISI 1XXX grade steel that is particularly suited for use in a housing of a vehicle occupant protection apparatus, such as shown and described with respect to FIG. 11, consists essentially of, by weight, about 0.07% to about 0.12% carbon, about 0.70% to about 1.60% manganese, up to about 0.020% phosphorous, up to about 0.015% sulfur, about 0.06% to about 0.35% silicon, about 0.25% to about 1.20% chromium, up to about 0.65% nickel, about 0.20% to about 0.70% molybdenum, up to about 0.35% copper, about 0.02% to about 0.06% aluminum, up to about 0.05% vanadium, up to about 0.25% residual elements, and the balance iron. By residual elements, it is meant the combined weight of additional elements including, for example, titanium, lead, niobium, cobalt, calcium, and/or tin.

In these variations of an SAE-AISI 1XXX grade steel, the carbon increases the strength of the steel, but decreases the ductility of the steel and the resistance of the steel to hydrogen embrittlement and stress corrosion cracking. When the carbon content of the steel is less than about 0.07% by weight, the steel may not have sufficient strength to be used in a housing of an inflator. When the carbon content is greater than about 0.20% by weight, the steel can be too susceptible to hydrogen embrittlement and stress corrosion cracking to be used in a housing of an inflator.

The manganese increases the strength and toughness of the steel, but decreases the ductility and resistance of the steel to hydrogen embrittlement and stress corrosion cracking. The manganese content is determined in relation to the carbon content. When the manganese content is greater than about 1.60% by weight, the steel can be too susceptible to hydrogen embrittlement and stress corrosion cracking to be used in a housing of an inflator.

The phosphorous decreases the creep and rupture strength of the steel and resistance of the steel to hydrogen embrittlement. When the phosphorous content is greater than 0.030% by weight, the steel can be too susceptible to hydrogen embrittlement to be used in a housing of an inflator.

Sulfur, like phosphorous, decreases the creep and rupture strength of steel and resistance of the steel to hydrogen embrittlement. When the sulfur content is greater than 0.025% by weight, the steel can be too susceptible to hydrogen embrittlement to be used in a housing of an inflator.

Silicon increases the strength of the steel and the oxidation resistance of the steel. Silicon also decreases the workability (i.e., increases the work hardening rate) of the steel. When the silicon content of the steel is less than about 0.06% by weight, the steel can be noticeably susceptible to oxidation during formation and welding of the steel. Oxidation of the steel degrades the strength and toughness of the steel. When the silicon content of the steel is greater than about 0.35% by weight, the workability of the steel can degrade so that the steel cannot be readily processed into a housing of an inflator.

Chromium increases the corrosion resistance and oxidation resistance of the steel, but decreases the workability (i.e., increases the work hardening rate) of the steel. When the chromium content of the steel is greater than about 1.20% by weight, the workability of the steel can degrade so that the steel cannot be readily processed into a housing of an inflator.

Nickel increases the ductility of the steel and corrosion resistance of the steel, but decreases the workability (i.e., increases the work hardening rate) of the steel. When the nickel content of the steel is greater than about 0.65% by weight, the workability of the steel degrades so that the steel cannot be readily processed into a housing of an inflator.

Molybdenum increases the corrosion resistance and oxidation resistance of the steel, but decreases the workability (i.e., increases the work hardening rate) of the steel. The molybdenum content is determined in relation with the chromium content. When the molybdenum content is greater than about 0.70% by weight, the workability of the steel can degrade so that the steel cannot be readily processed into a housing of an inflator.

Copper increases the corrosion resistance of steel, but decreases the resistance of the steel to stress corrosion cracking. When the copper content of the steel is greater than about 0.35% by weight, the steel is too susceptible to stress corrosion cracking to be used in a housing of an inflator.

Aluminum improves the corrosion resistance, the workability, and the ductility of the steel. When the aluminum content of the steel is at least about 0.02% by weight, the corrosion resistance, workability, and ductility of the steel noticeably increase. When the aluminum content of the steel is greater than about 0.06% by weight, the workability of the steel can degrade so that the steel cannot be readily processed into a housing of an inflator.

Vanadium increases the corrosion resistance and abrasion resistance of the steel. When the vanadium content is greater than about 0.10%, the workability of the steel degrades so that the steel cannot be readily processed into a housing of an inflator.

In another aspect of the invention, the slug can comprise a variation of an SAE-AISI 1XXX grade steel. This variation an SAE-AISI 1XXX grade steel is particularly suited for use in a housing of a vehicle occupant protection apparatus, such as shown and described with respect to FIG. 11. The steel composition in this aspect of the invention consists essentially of, by weight, about 0.04% to about 0.12% carbon, about 0.40% to about 1.70% manganese, up to about 0.02% phosphorous, up to about 0.02% sulfur, up to about 0.5% silicon, about 0.10% to about 1.20% chromium, up to about 0.65% nickel, up to about 0.70% molybdenum, up to about 0.35% copper, up to about 0.08% aluminum, about 0.01 to about 0.10% vanadium, about 0.01 to about 0.10% niobium, about 0.01 to about 0.10% titanium, up to about 0.25% residual elements, and the balance iron. By residual elements, it is meant the combined weight of additional elements including, for example, lead, cobalt, calcium, and/or tin.

Another variation of an SAE-AISI 1XXX grade steel that is particularly suited for use in a housing of a vehicle occupant protection apparatus, such as shown and described with respect to FIG. 11, consists essentially of, by weight, about 0.04% to about 0.12% carbon, about 1.0% to about 1.70% manganese, up to about 0.02% phosphorous, up to about 0.02% sulfur, about 0.40% to about 0.75% silicon, about 0.10% to about 0.50% chromium, about 0.10% to about 0.50% nickel, about 0.05% to about 0.60% molybdenum, up to about 0.35% copper, up to about 0.04% aluminum, about 0.01 to about 0.10% vanadium, up to about 0.25% residual elements, and the balance iron. By residual elements, it is meant the combined weight of additional elements including, for example, niobium, titanium, lead, cobalt, calcium, and/or tin.

Besides low-carbon steels, the steel used to form the slug can comprise a high-alloy or stainless steel. Examples of high-alloy or stainless steel that can be used in accordance with the present invention are an austenitic 301 steel, an austenitic 301N steel, and variations of an austenitic 301 steel and an austenitic 301N steel.

An example of a variation of an austenitic 301 steel that is particularly suited for use in a housing of a vehicle occupant protection apparatus, such as shown and described with respect to FIG. 11, consists essentially of by weight less than about 0.03% carbon, less than about 2.00% manganese, less than about 0.005% sulfur, less than about 0.030% phosphorous, less than about 1.00% silicon, between about 16.00% and about 18.00% chromium, between about 6.00% and about 8.00% nickel, and less than about 0.025% residual elements. The balance of the composition is iron. By residual elements, it is meant additional elements including titanium, lead, niobium, cobalt, aluminum, calcium, and/or tin.

An example of a variation of an austenitic 301N steel that is particularly suited for use in a housing of a vehicle occupant protection apparatus, such as shown and described with respect to FIG. 11, consists essentially of by weight less than about 0.03% carbon, less than about 2.00% manganese, less than about 0.005% sulfur, less than about 0.030% phosphorous, less than about 1.00% silicon, less than about 0.30% nitrogen, between about 16.00% and about 18.00% chromium, between about 6.00% and about 8.00% nickel, and less than about 0.025% residual elements. The balance of the composition is iron. By residual elements, it is meant additional elements including titanium, lead, niobium, cobalt, aluminum, calcium, and/or tin.

The slug of steel provided in the method 50 of FIG. 2 can be formed by casting the low-carbon or high-alloy steel into the shape of a bar or rod. The slug of steel can be semi-finished by, for example, hot-working, forging, rolling, or annealing so that the slug has a tensile strength of at least about 350 MPa, a yield strength of at least about 200 MPa, and an elongation at break of at least about 22%, all measured in accordance with ASTM A370. The slug can also have a grain size of at least about 5.0 or finer, as measured in accordance with ASTM E112.

The slug can be in the form of a round billet that has a substantially cylindrical surface that extends from a first end to a second end of the slug. The length and diameter of the slug can vary depending on the size of the seamless tube formed from the slug. By way of example, the slug can have length of about 70 mm to about 100 mm and a diameter of about 25 mm to about 50 mm.

At 54, the slug is formed into a seamless tube of the dual chamber housing by cold working the first end and the second end of the slug to form, respectively, a first chamber and a second chamber. By cold working in accordance with the present invention, it is meant that the first end and the second end of the slug of steel are plastically deformed by, for example, cold drawing, cold rolling, or cold extruding (i.e., cold impacting) at a temperature that is cold enough to prevent spontaneous recrystallization of the grains of the steel during working (e.g., rolling, drawing, or extruding). This temperature is typically about room temperature, but can be as high as about 500° C. depending on the steel composition. By "room temperature", as used in the specification and the claims, it is meant a temperature that is less than about 100° C. (e.g., about 25° C.).

Figure 3:
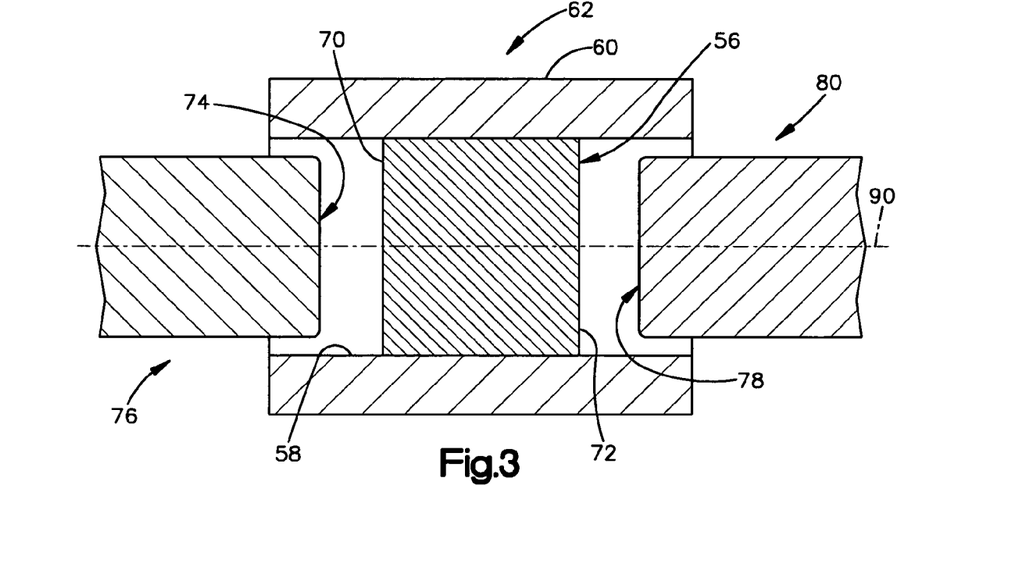
FIG. 3 illustrates a schematic cross-sectional view of a slug of steel being cold worked in accordance with one aspect of the invention.
Figure 4:
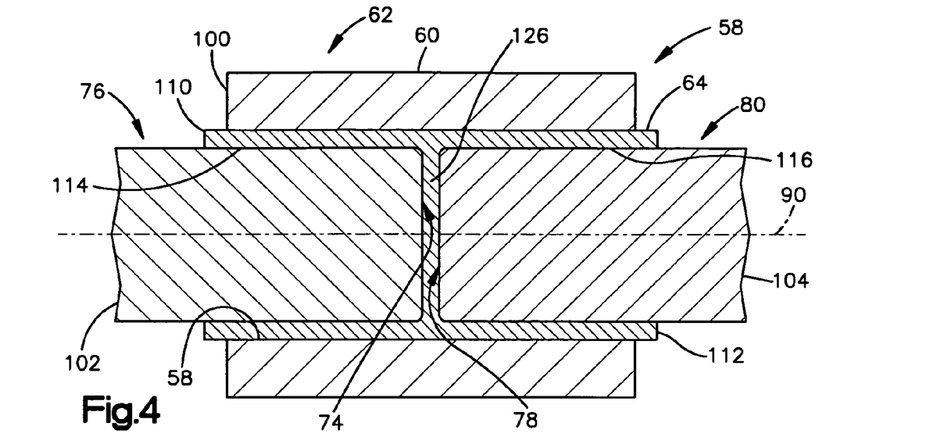
FIG. 4 illustrates a schematic cross-sectional view of the slug of FIG. 3 being further cold worked to form a seamless tube.

In an aspect of the invention, the first end and the second end can be cold worked by cold extruding (i.e., cold impacting) the first end and the second end. FIGS. 3 and 4 illustrate a slug of steel being cold extruded (or cold impacted) to form a first chamber and a second chamber of a seamless tube of a dual chamber housing. Referring to FIG. 3, a slug 56 is placed in a cavity 58 of a die block 60 of an extrusion die 62. The cavity 58 has a substantially cylindrical shape that defines the outer shape of a seamless tube 64 (FIG. 4).

Pressure is then applied substantially simultaneously to a first end 70 and a second end 72 of the slug 56 by respectively, a working end 74 of a first extruding punch 76 and a working end 78 of a second extruding punch 80. The working end 74 of the first extruding punch 76 has a substantially cylindrical shape and a diameter that is less than the diameter of the cavity 58 of the die block 60. Likewise, the working end 78 of the second extruding punch 80 has a substantially cylindrical shape and a diameter that is less than the diameter of the cavity 58 of the die block 60.

The working end 74 of the first extruding punch 76 and the working end 78 of the second extruding punch 80 are aligned with a central axis 90 of the slug and forced by, for example, ram presses (not shown) against the first end 70 and the second end 72. Referring to FIG. 4, pressure from the first extruding punch 76 and the second extruding punch 78 causes the steel of the slug 56 initially to assume the shape of the cavity 58 of the die block 60 as well as the shape of the working end 74 of the first extruding punch 76 and the working end 78 of the second extruding punch 80. The pressure applied by the first extruding punch 76 and the second extruding punch 78 then causes the steel of the slug 56 to extrude between a wall 100 of the die block 60 and a shaft 102 of the first extruding punch 76 and a shaft 104 of the second extruding punch 80.

The extruded steel forms a first annular wall 110 and a second annular wall 112. The first annular 110 and the second annular wall 112 define a first chamber 114 and a second chamber 116 of the seamless tube 64. The pressure is continued until an intermediate wall portion 126, which separates the first chamber 114 and the second chamber 116, is formed with a desired thickness.

The diameters of the shafts 102 and 104 of the first extruding punch 76 and the second extruding punch 80 can be the same or different and will depend on the desired thickness of the first annular wall 110 and the second annular wall 112 as well as the volume of the first chamber 114 and the second chamber 116. The amount of clearance between the wall 100 of the die block 60 and the shafts 102 and 104 of the first extruding punch 80 and the second extruding punch 80 can determine the thickness of annular walls 110 and 112 so formed. The shape of wall 100 of the die block 60 can also vary along its length to vary the shape of the outer surface of the seamless tube 64. Additionally, the first extruding punch 76 and the second extruding punch 80, as well as the first end 70 and second end 72 of the slug 56, may be lubricated with an oil based or water based emulsion prior to cold extruding in order to reduce the heat generated by friction as the first extruding punch 76 and the second extruding punch 80 are pressed against the slug 56.

The thickness of the first annular wall 110 and the second annular wall 122 after cold extruding can be substantially uniform along an axis of the tube 64 and circumferentially around the tube 64. For example, the thickness of the first annular wall 110 and the second annular wall 112 can be about 2.5 mm to about 7.5 mm. The length of the seamless tube 64 so formed can be substantially greater than the length of slug 56. For example, the slug 56 can have a length of about 60 mm to about 70 mm and the seamless tube 64 can have a length of about 190 mm to about 260 mm.

The volumes of the first chamber 114 and the second chamber 116 can be the same or different. For example, where the seamless tube 64 has a length of about 200 mm, the first chamber 114 can have a depth of about 116 mm and a diameter of about 40 mm (i.e., volume of about 146 cm$^3$), and the second chamber 116 can have a depth of the about 80 mm and a diameter of about 40 mm (i.e., volume of about 100 cm$^3$). Providing the first chamber 114 and the second chamber 116 with different volumes allows for different quantities of gases at the same pressure to be stored in the first chamber 114 and the second chamber 116.

Figure 5:
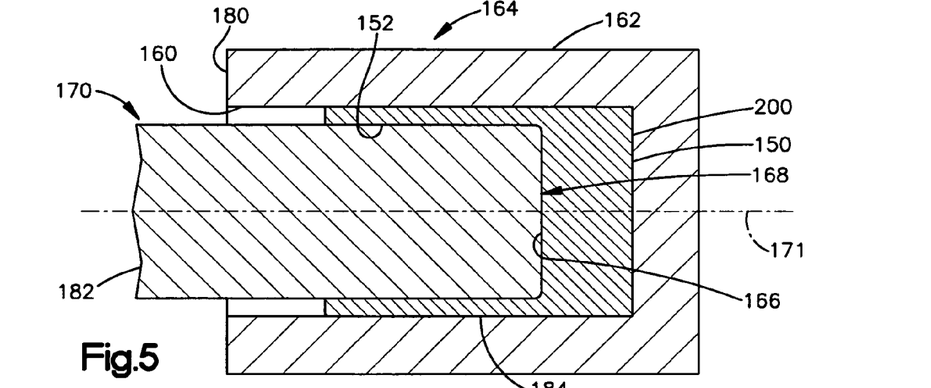
FIG. 5 illustrates a schematic cross-sectional view of one end of a slug of steel being cold worked in accordance with another aspect of the invention.
Figure 6:
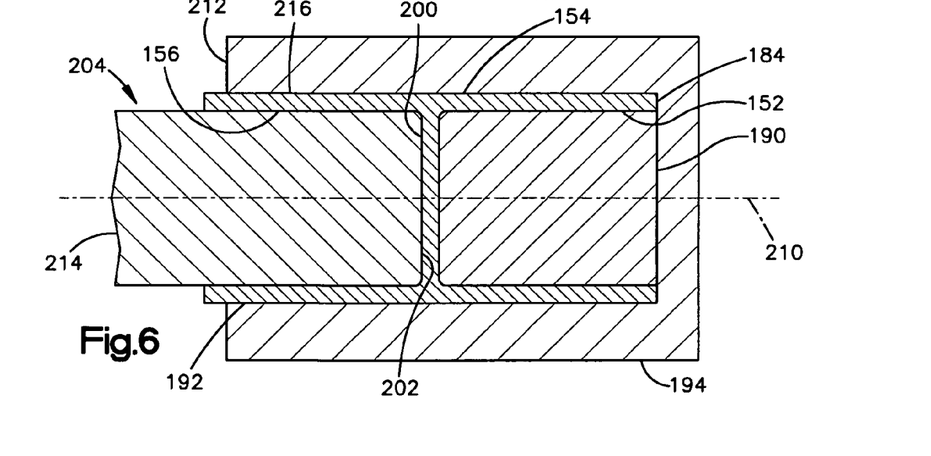
FIG. 6 illustrates a schematic cross-sectional view of another end of the slug of FIG. 5 being cold worked in accordance with another aspect of the invention.

Alternatively, instead of cold working the first end and the second end of the slug substantially simultaneously, the first end and the second end of the slug can be cold worked in separate cold working steps. For example, the first end of the slug can be initially cold worked to form the first chamber, and the second end of the slug can be subsequently cold worked to form the second chamber. FIGS. 5 and 6 illustrate a slug 150 of steel being cold extruded in first step to form a first chamber 152 of a seamless tube 154 and in a second step to form a second chamber 156 of the seamless tube 154. Referring to FIG. 5, the slug 150 is placed in a cavity 160 of a die block 162 of an extrusion die 164. The cavity 160 has a substantially cylindrical shape that defines the outer shape of the seamless tube 154.

Pressure is applied to a first end 166 of the slug 150 by a working end 168 of a first extruding punch 170. The working end 168 of the first extruding punch 170 has a substantially cylindrical shape and a diameter that is less than the diameter of the cavity 160 of the die block 162.

The working end 168 of the first extruding punch 170 is aligned with a central axis 171 of the slug 150 and forced by, for example, a ram press (not shown) against the first end 166. Pressure from the first extruding punch 170 causes the steel of the slug 150 initially to assume the shape of the cavity 160 of the die block 162 and of the working end 168 of the first extruding punch 170. The pressure applied by the first extruding punch 170 causes the steel of the slug to extrude between a wall 180 of the die block 162 and a shaft 182 of the first extruding punch 170 and form a first annular wall 184. Pressure is applied to the first end 166 of the slug 150 until the first chamber 152 of the seamless tube 154 is formed.

FIG. 6 illustrates that after the first chamber 152 is formed, a blank 190 that has a shape substantially similar to the shape of the first chamber 152 is provided in the first chamber 152. The seamless tube 154 and blank 190 are then placed in a cavity 192 of a second die block 194. The second die block 194 can be the same die block as the first die block,162 that is used to form the first chamber 152 or be a different die block. Where the second die block 194 is different than the first die block 162, the cavity 192 of the second die block 194 can have a substantially similar or different shape than the cavity 160 of the first die block 162.

Pressure is then applied to a second end 200 of the seamless tube 154 by a working end 202 of a second extruding punch 204. The working end 202 of the second extruding punch 204 has a substantially cylindrical shape and a diameter that is less than the diameter of the cavity 192 of die block 194. The second extruding punch 204 can be similar to the first extruding punch 170 or different. Where the second extruding punch 204 is different than the first extruding punch 170, the second extruding punch 204 can have a substantially similar or different shape than the first extruding punch 170.

The working end 202 of the second extruding punch 204 is aligned with a central axis 210 of the seamless tube and forced by, for example, a ram press (not shown) against the second end 200 of the seamless tube 154. Pressure from the second extruding punch 204 causes the steel of the second end 200 initially to assume the shape of the cavity 192 of the second die block 194 and of the working end 202 of the second extruding punch 204. The pressure applied by the second extruding punch 204 causes the steel of the second end 200 to extrude between a wall 212 of the second die block 194 and a shaft 214 of the second extruding punch 204 and form a second annular wall 216. Pressure is applied to the second end 200 of the seamless tube 154 until the second chamber 156 of the seamless tube 154 is formed.

As with the cold extruding process illustrated in FIGS. 3 and 4, the first extruding punch 170 and the second extruding punch 194 of FIGS. 5 and 6 may be lubricated with an oil based or water based emulsion prior to cold extruding in order to reduce the heat generated by friction as the first extruding punch 170 and the second extruding punch 194 are pressed against the first end 166 and the second end 202. Additionally, the thickness of the first annular wall 184 and the second annular wall 216 after the cold extruding with the first extruding punch 170 and the second punch 204 can be uniform along the axis 210 of the seamless tube 154 and circumferentially around the seamless tube. The length of the seamless tube 154 so formed can be substantially greater than the length of slug 150. The volumes of the first chamber 152 and the second chamber 156 can also be the same or different.

It will be appreciated that first annular wall and the second annular wall of the seamless tube formed by either of the foregoing methods can be further cold worked by, for example, additional cold extruding, cold drawing, or cold rolling steps. The additional cold working can further improve the strength (e.g., yield strength and/or tensile strength) of the first annular wall and the second annular wall as well as further refine the dimensions of the first chamber and the second chamber defined by the first annular wall and the second annular wall. It will also be appreciated that although the first chamber and the second chamber are formed by cold extruding or cold impacting, the first chamber and the second chamber can be formed by other cold working processes, such as cold piercing and cold drawing.

When the steel used to form the seamless tube is cold worked, its mechanical properties are changed. The most noticeable effects are a decrease in ductility and an increase in strength (e.g., tensile strength and/or yield strength) of the cold worked steel. A subsequent heat treatment process can mitigate this decrease in ductility.

Figure 7:
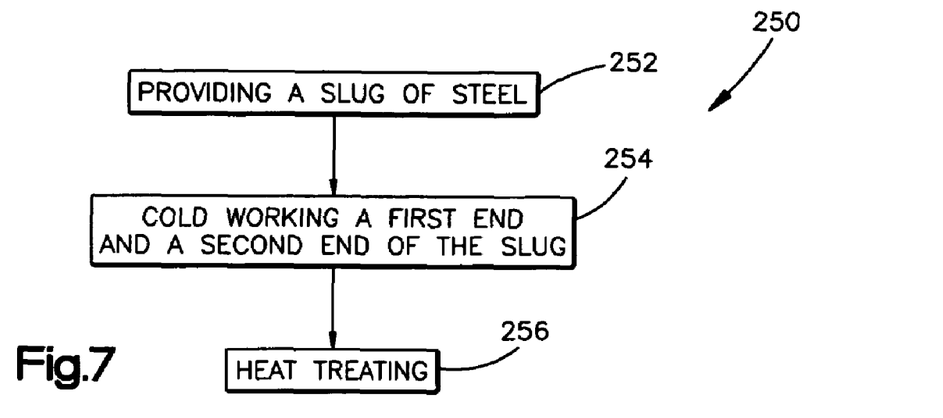
FIG. 7 illustrates a schematic flow diagram of a method of forming a dual chamber housing in accordance with another aspect of the invention.

FIG. 7 is a schematic flow diagram illustrating a method 250 of forming a seamless tube in accordance with another aspect of the invention. In the method 250, at 252, a slug is provided in accordance with the step 52 of the method 50 (FIG. 2). At 254, a first end and a second end of the slug are cold worked in accordance with step 54 of the method 50 (FIG. 2). At 256, the seamless tube formed by cold working the slug is heat treated to improve substantially the ductility and toughness of the seamless tube.

Figure 8:
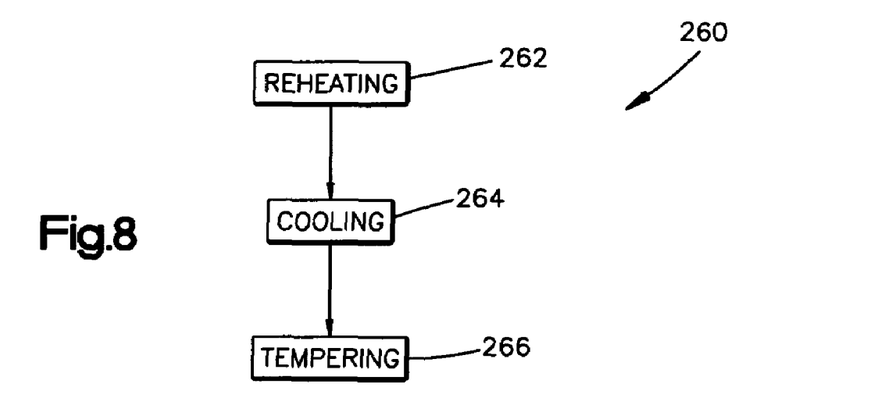
FIG. 8 illustrates a schematic flow diagram of the heat treatment step of FIG. 7.

FIG. 8 illustrates a heat treatment process 260 in accordance with the present invention that can be used to improve substantially the ductility of the cold worked seamless tube. In the heat treatment process 260, at 262, the cold worked seamless tube can be transferred to a heating chamber of a reheating furnace and heated to a temperature of at least about 900° C. (e.g., about 920° C.). The heat can be supplied to the heating chamber of the reheating furnace by radiation and/or convection from a heating source, such as from combusting a gaseous or liquid fuel or from an electrically heated member.

The seamless tube is maintained at a temperature of at least about 900° C. within the heating chamber for at least about 15 minutes. Preferably the seamless tube is maintained at a temperature of at least about 900° C. within the heating chamber for at least about 20 minutes.

At 264, the seamless tube, after being heated within the chamber for at least about 15 minutes, is cooled to room temperature. The seamless tube can be cooled to room temperature by, for example, quenching seamless tube with sprayed water and then placing the seamless tube in an air atmosphere, which is at room temperature.

Once the seamless tube is at room temperature, at 266, the seamless tube is tempered until the temperature of the seamless reaches about 500° C. Upon reaching a temperature of about 500° C., the seamless tube is cooled to room temperature by placing the seamless tube in an air atmosphere, which is at room temperature.

The seamless tube heat treated by this process has a tensile strength of at least about 130,000 psi, a yield strength of at least about 104,000 psi, and an elongation at break of at least about 14%. The seamless tube treated by this process also remains ductile at temperatures down to about −40° C. By "ductile", it is meant that when stress is applied to the seamless tube effective to cause the seamless tube to fracture, the seamless tube demonstrates substantial plastic deformation before fracturing. For example, the seamless tube yields plastically at least about 5% before fracturing, when stress effective to cause the seamless tube to so yield is applied to the seamless tube.

Figure 9:
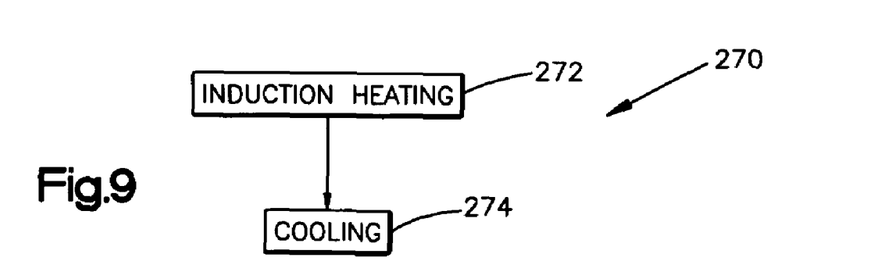
FIG. 9 illustrates a schematic flow diagram of another aspect of the heat treatment step of FIG. 7.

FIG. 9 illustrates an alternate heat treatment process 270 in accordance with the present invention. In the heat treatment process 270, the seamless tube can be heat treated by transferring the seamless tube to a heating chamber of an induction furnace and induction heating the seamless tube to a temperature of at least about 900° C. (e.g., about 920° C.). In induction heating, power applied to a primary coil in the heating chamber of the induction furnace creates a magnetic flux that passes through seamless tube and heats the seamless tube by the electrical resistance.

The seamless tube is maintained at a temperature of at least about 900° C. within the heating chamber for at least about 15 minutes. For example, the seamless tube can be maintained at a temperature of at least about 900° C. within the heating chamber for at least about 20 minutes.

At 274, the seamless tube, after being heated within the heating chamber of the induction furnace for at least about 15 minutes, is cooled to room temperature by, for example, quenching the seamless tube with sprayed water and then placing the seamless tube in an air atmosphere, which is at room temperature.

It was found that a seamless tube treated by this heat treatment process did not have to be tempered, after quenching, in order to improve the toughness of the seamless tube at low temperatures. The seamless tube treated by this process has a tensile strength of at least about 130,000 psi, a yield strength of at least about 104,000 psi, and an elongation at break of at least about 14%. Surprisingly, it was found that the seamless tube treated by this process remains ductile at temperatures down to about −100° C. It is believed that the induction furnace heats the seamless tube quicker and more uniformly than a conventional furnace, and that this quicker and more uniform heating provides the seamless tube with its improved ductility down to −100° C.

Figure 10:
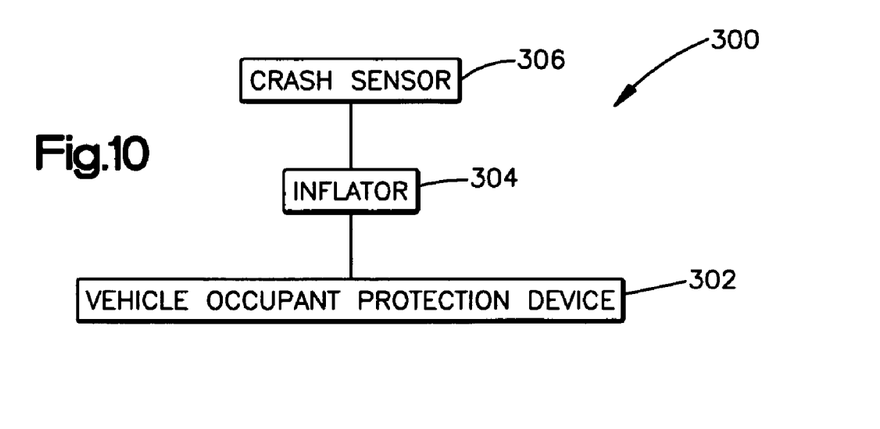
FIG. 10 illustrates a schematic view of a vehicle occupant protection apparatus in accordance with another aspect of the present invention.

In accordance with another aspect of the invention, the seamless tube so formed can be used to form a housing of an inflator of a vehicle occupant protection apparatus. Referring to FIG. 10, the vehicle occupant protection apparatus 300 includes an inflatable vehicle occupant protection device 302. The inflatable vehicle occupant protection device 302 can be an air bag. The inflatable vehicle occupant protection device 302 can also be, for example, an inflatable seat belt, an inflatable knee bolster, an inflatable head liner, an inflatable side curtain, or a knee bolster operated by an air bag.

An inflator 304 is associated with the vehicle occupant protection device 302. The inflator 304 is actuatable to direct inflation fluid to the inflatable vehicle occupant protection device 302 to inflate the inflatable vehicle occupant protection device 302.

The vehicle occupant protection apparatus 300 also includes a crash sensor 306. The crash sensor 306 is a known device that senses a vehicle condition, such as vehicle deceleration, indicative of a collision. When the crash sensor 306 senses a vehicle condition for which inflation of the inflatable vehicle occupant protection device 302 is desired, the crash sensor 306 either transmits a signal or causes a signal to be transmitted to actuate the inflator 304. The inflatable vehicle occupant protection device 302 is then inflated and extends into the occupant compartment of the vehicle to help protect a vehicle occupant from a forceful impact with parts of the vehicle.

Referring to FIG. 11, the inflator 304 includes a dual chamber housing 350. The dual chamber housing comprises a seamless tube 352 that extends along an axis 354 from a first end 356 to a second end 358. The seamless tube 352 defines a substantially cylindrical outer surface 360 that extends the length of the seamless tube 352.

The seamless tube 352 includes a first annular wall portion 362 and a second annular wall portion 364. The first annular wall portion 362 includes an inner surface 366 that extends from the first end 356 to a first surface 368 of an intermediate wall portion 370 of the seamless tube 352. The inner surface 366 of the first annular wall portion 362 and the first surface 368 of the intermediate wall portion 370 define a first chamber 380. The first chamber 380 has a substantially cylindrical shape and is centered on axis 354.

The second annular wall portion 364 includes an inner surface 382 that extends from the second end 358 to a second surface 384 of the intermediate wall portion 370. The inner surface 382 of the second annular wall portion 364 and the second surface 384 of the intermediate wall portion 370 define a second chamber 390. The intermediate wall portion 370 separates the first chamber 380 from the second chamber 390. The second chamber 390 has a substantially cylindrical shape and is axially aligned with the first chamber 380.

The first annular wall portion 362, the second annular wall portion 364, and the intermediate wall portion 370 of the seamless tube 352 comprise a homogenous steel material. The first wall portion 362, the second annular wall portion 364, and the intermediate wall portion 370 are also integral with each other so that the seamless tube 352 has a one-piece structure that comprises the homogenous steel material.

The dual chamber housing 350 further includes a first end cap 400 and a second end cap 402 that contain a first inflation fluid 404 and a second inflation fluid 406 under pressure, respectively, in the first chamber 380 and the second chamber 390. The first end cap 400 and the second end cap 402 can be secured, respectively, to the first end 356 and the second end 358 by any suitable means. For example, the first end cap 400 and the second end cap 402 can be secured respectively to the first end 356 and the second end 358 by a circumferentially extending friction weld 410.

The first inflation fluid 404 and the second inflation fluid 406 stored in the first chamber 380 and second chamber 390 can each include a primary gas. The primary gas can be a substantially inert gas, such as helium, argon, nitrogen, or a substantially inert mixture of gases (e.g., air). The inflation fluids 404 and 406 can also include a combustible mixture of gases, such as a mixture of an oxidizer gas (e.g., oxygen and/or air) and a fuel gas (e.g., hydrogen, nitrous oxide, and/or methane).

The first inflation fluid 404 and the second inflation fluid 406 can have similar compositions or have different compositions. The specific compositions of the first inflation fluid 404 and the second inflation fluid 406 will depend at least in part on the desired output gas composition.

The pressures at which the first inflation fluid 404 and the second inflation fluid 406 are stored in the first chamber 380 and the second chamber 390 depend upon such factors as the volume of the inflatable vehicle occupant protection device 302 to be inflated, the time available for inflation, the inflation pressure desired, and the volumes of the chambers 380 and 390 storing the inflation fluids 404 and 406. The inflation fluids 404 and 406 in the first chamber 380 and the second chamber 390 are typically at a pressures of about 2,000 to about 8,000 pounds per square inch (psi).

The first end cap 400 includes a tubular igniter support 410 that extends axially outward from an outer end surface 412 of the first end cap 400. The igniter support 410 defines a generally cylindrical igniter chamber 414 in the first end cap 400. The igniter chamber 414 communicates with a cylindrical inlet passage 416 in the first end cap 400.

The first end cap 400 has an annular outlet passage 420 located radially outward of the inlet passage 416. The outlet passage 420 is centered on the axis 354 and is separated radially from the inlet passage 416 by an annular, non-rupturing wall portion 422 of the first end cap 400. The wall portion 422 of the first end cap 400 blocks fluid flow between the inlet passage 416 and the outlet passage 420.

A plurality of cylindrical gas exit ports 424 extend radially outward from the outlet passage 420. The exit ports 424 extend to the exterior of the first end cap 400, for directing inflation fluid from the outlet passage 420 into the vehicle occupant protection device 302 (FIG. 10).

The first end cap 400 includes a burst disc 430 for closing the inlet passage 416 and the outlet passage 420. The burst disc 430 can be made as one piece from a single continuous body or piece of homogeneous material, for example, steel. The burst disc 430 can have a first rupturable portion 432, which overlies the inlet passage 416, and a second rupturable portion 434, which overlies the outlet passage 420.

A first circumferentially extending weld 440 and second circumferentially extending weld 442 fix and seal the burst disc 430 to the first end cap 400. When the burst disc 430 is welded to the end cap 400 and the first chamber 380 is pressurized with the inflation fluid 404, the pressure of the fluid 404 in the first chamber 380 forces the burst disc firmly against the first end cap 400.

The first end cap 400 further includes an igniter 450, which functions to actuate the inflator 304 at least partially. The igniter 450 can comprise a conventional automotive squib with a pair of terminals 452. A small charge of pyrotechnic material (not shown) is contained in the igniter 450. The pyrotechnic material is ignitable upon the passage of electric current through the igniter 450 between the terminals 452.

The second end cap 402 is similar in construction to the first end cap 400 so the parts of both end caps 402 are numbered the same. The igniter of the second end cap 402 can be actuated independently of (e.g., simultaneously with or at a different time from) igniter 450 of the first end cap 400. This provides the ability to tailor the rate of gas flow into the vehicle occupant protection device 402 as a function of time.

The seamless tube 352 of the dual chamber housing 350 of the inflator 304 can be formed from a low-carbon steel or a high-alloy steel in accordance with the present invention. The low-carbon steel can comprise, for example, a low-carbon SAE-AISI 10XX grade steel, 11XX grade steel, 12XX grade, 15XX grade steel, or variations of SAE-AISI 1XXX grade steel. One skilled in the art will appreciate that other low-carbon steels can also be used.

Figure 12:
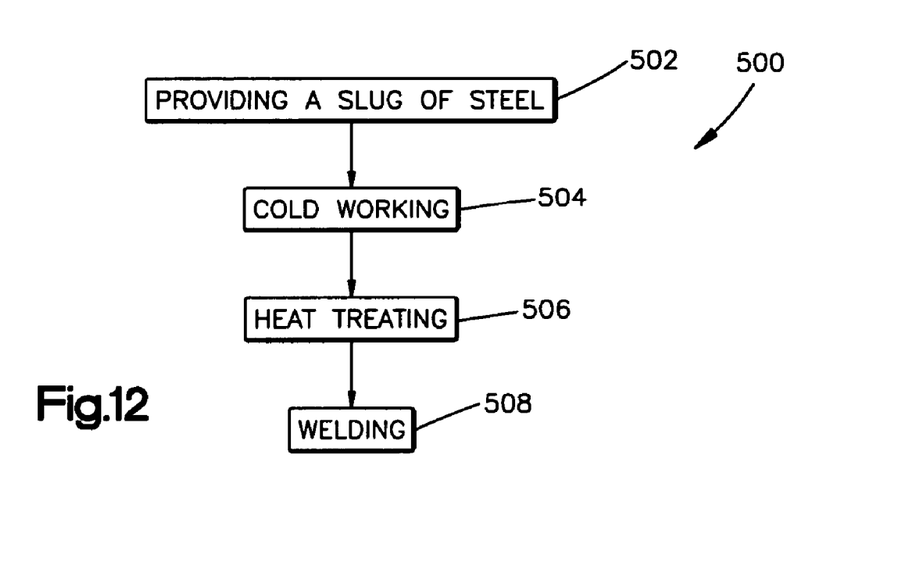
FIG. 12 illustrates a schematic flow diagram of a method of producing a dual chamber housing in accordance with yet another aspect of the present invention.

FIG. 12 is a schematic illustration of a method 500 of forming the dual chamber housing of the inflator 304 in accordance with the present invention. In the method 500, at 502, a substantially cylindrical slug of steel with a first end and a second end is provided. The slug of steel can comprise a low-carbon steel or high-alloy steel in accordance with the invention. The slug of steel can be semi-finished by, for example, hot-working, forging, rolling, or annealing so that the slug has a tensile strength of at least about 350 MPa, a yield strength of at least about 200 MPa, and an elongation at break of at least about 22%, all measured in accordance with ASTM A370. The slug can also have a grain size of about 5.0 or finer, as measured in accordance with ASTM E112. The slug can have a uniform diameter along the entire length of the slug (i.e., from the first end of the slug to the second end). For example, the slug can have length of about 70 mm to about 100 mm and a diameter of about 25 mm to about 50 mm.

At 504, the slug is formed into the dual chamber seamless tube by cold working the first end of the slug to form a first chamber and cold working the second end to form a second chamber. The first end and the second end can be cold worked by cold extruding the first end and the second end substantially simultaneously to form, respectively, the first chamber and the second chamber. Alternatively, instead of cold working the first end and the second end of the slug substantially simultaneously, the first end and second end of the slug can be cold worked in separate cold working steps.

At 506, the seamless tube formed by cold working the slug is heat treated to improve the ductility and toughness of the seamless tube substantially. The heat treatment can be performed by transferring the cold worked seamless tube to a heating chamber of a reheating furnace, heating the seamless tube to a temperature of at least about 900° C., cooling the seamless tube to room temperature, and tempering the seamless tube until the temperature of the seamless tube reaches about 500° C. Upon reaching a temperature of about 500° C., the seamless tube is cooled to room temperature by placing the seamless tube in an air atmosphere, which is at room temperature.

The seamless tube heat treated by this process has a tensile strength of at least about 130,000 psi, a yield strength of at least about 104,000 psi, and an elongation at break of at least about 14%. The seamless tube treated by this process also remains ductile at temperatures down to about −40° C. For example, the seamless tube yields plastically at least about 5% before fracturing, when stress effective to cause the seamless tube to so yield is applied to the seamless tube.

Alternatively, the seamless tube can be heat treated by transferring the seamless tube to a heating chamber of an induction furnace, induction heating the seamless tube to a temperature of at least about 900° C., and then cooling the seamless tube to room temperature, for example, by quenching the seamless tube with sprayed water and then placing the seamless tube in an air atmosphere, which is at room temperature.

The seamless tube treated by this process has a tensile strength of at least about 130,000 psi, a yield strength of at least about 104,000 psi, and an elongation at break of at least about 14%. Surprisingly, it was found that the seamless tube heat treated by this process remains ductile at temperatures down to about −100° C.

At 508, a first end cap and a second end cap, such as end caps 400 and 402 (FIG. 11), are welded, respectively, to the first end and the second end of the heat treated seamless tube. The first end cap and the second end cap can both be form from a steel that has a steel composition similar to the steel composition of the seamless tube.

The first end cap and the second end cap can be welded to the seamless tube by any suitable means, such as friction welding, autogenous gas tungsten arc welding, electron beam welding, or laser welding. In an aspect of the invention, the seamless tube, first end cap and second end cap are welded together by friction welding.

From the above description of the invention, those skilled in the art will perceive improvements, changes and modifications. Such improvements, changes and modifications within the skill of the art are intended to be covered by the appended claims.

Having described the invention, the following is claimed:

1. A method of forming a housing of a vehicle occupant protection apparatus, the method comprising:
   providing a slug of steel, the slug extending from a first end to a second end;
   cold working the first end and the second end to form a first chamber, a second chamber, and a wall portion, the second chamber being axially aligned with the first chamber and being separated from the first chamber by the wall portion;
   heat treating the cold worked first end and the cold worked second end; and
   attaching a first end cap to the heat treated first end and attaching a second cap to the heat treated second end.

2. The method of claim 1, the first end cap and the second end cap being attached by welding.

3. The method of claim 1, the first end and the second end being cold worked simultaneously to form the first chamber, the second chamber, and the wall portion.

4. The method of claim 1, the slug being low-carbon steel.

5. The method of claim 1, the slug having a first length and the housing having a second length substantially greater than the first length.

6. The method of claim 1, wherein cold working the first end comprises forming a first annular wall from the first end of the slug, and cold working the second end comprises forming a second annular wall from the second end of the slug.

7. The method of claim 1, wherein cold working the first end comprises placing the slug in a cavity of a die and applying pressure to the first end with a first punch, and cold working the second end comprises placing the slug in the cavity of the die and applying pressure to the second end with a second punch.

8. The method of claim 7, the first end being cold worked while the second end is cold worked.

9. The method of claim 7, the cavity of the die having a substantially cylindrical shape that defines the shape of the housing.

10. The method of claim 7, the slug comprising a steel having a tensile strength of at least about 350 MPa, a yield strength of at least about 200 MPa, and at least about 22% elongation at break.

11. The method of claim 1, wherein heat treating the cold worked first end and the cold worked second end comprises induction heating the cold worked first end and the cold worked second end and then cooling the induction heated first end and second end.

12. The method of claim 11, the cold worked first end and the cold worked second end being induction heated to a temperature of at least about 900° C.

* * * * *